United States Patent [19]
Cantu et al.

[11] Patent Number: 5,801,304
[45] Date of Patent: Sep. 1, 1998

[54] METHOD OF FORESEEING TREAD WEARING OF A PNEUMATIC TIRE

[75] Inventors: Marco Cantu, Carnate; Federico Mancosu; Alessandro Volpi, both of Milan, all of Italy

[73] Assignee: Pirelli Coordinamento Pneumatici S.P.A., Milan, Italy

[21] Appl. No.: 728,795

[22] Filed: Oct. 10, 1996

[30] Foreign Application Priority Data

Oct. 9, 1995 [IT] Italy ............................ MI95 A 002056

[51] Int. Cl.⁶ ........................................................ E01C 23/00
[52] U.S. Cl. ........................................................ 73/146
[58] Field of Search ................... 73/146, 8, 9; 152/209 R, 152/209 D, 212; 356/4, 429, 430, 431

[56] References Cited

U.S. PATENT DOCUMENTS

| | | |
|---|---|---|
| D. 301,132 | 5/1989 | Himuro et al. . |
| 2,094,636 | 10/1937 | Bull . |
| 2,121,955 | 6/1938 | Eger . |
| 2,926,715 | 3/1960 | Constantakis . |
| 3,535,536 | 10/1970 | Pernau .................... 73/146 |
| 4,028,937 | 6/1977 | Crano ...................... 73/146 |
| 4,095,464 | 6/1978 | Breedijk .................. 73/146 |
| 4,298,046 | 11/1981 | Herbelleau et al. . |
| 4,566,514 | 1/1986 | Maük et al. ............ 152/209 R |
| 4,703,788 | 11/1987 | Kusube et al. ........ 152/209 R |
| 5,245,867 | 9/1993 | Sube et al. ............... 73/146 |

FOREIGN PATENT DOCUMENTS

| | | |
|---|---|---|
| 0310301A1 | 4/1989 | European Pat. Off. . |
| 0547365A2 | 6/1993 | European Pat. Off. . |
| 60-255506 | 12/1985 | Japan . |
| 63-263105 | 10/1988 | Japan . |
| 338406 | 2/1991 | Japan . |
| 640215 | 2/1994 | Japan . |
| 2093777 | 9/1982 | United Kingdom . |

OTHER PUBLICATIONS

European Search Report, May 31, 1996.

*Primary Examiner*—William L. Oer
*Attorney, Agent, or Firm*—Stevens, Davis, Miller & Mosher, L.L.P.

[57] ABSTRACT

A method of foreseeing and controlling wearing in the tread of a tire based on the use of cuts of a limited depth (in the order of tenth parts of one millimeter) formed on the external surface of the tread, in the thickness of the elastomeric material. The cut is preferably made by a laser beam. Rotation of the tire on a road or on any other friction surface enables both the uneven wearing of the tread, highlighted by localized spots devoid of cuts, to be quickly verified by inspecting the maintenance state of the cuts. Also, and the wear rate of the tread can be drawn from calculation of the time, during the rotation, elapsing between the disappearance of two groups of cuts of different depth.

34 Claims, 3 Drawing Sheets

METHOD OF FORESEEING TREAD WEARING OF A PNEUMATIC TIRE

BACKGROUND OF THE INVENTION

The present invention relates to a method of foreseeing and/or controlling tread wear in a pneumatic tire and a related pneumatic tire suitably arranged for use of such a verification method. More particularly, the invention relates to a method of foreseeing and/or controlling tread wear in a tire while leaving substantially unchanged the integrity of the tire.

It is known that a pneumatic tire generally consists of a carcass of toric form, having a crown on which is a disposed tread band of elastomeric material constituting the ground-contacting portion of the tire running on a road. The tread band is generally comprised of a raised pattern mainly consisting of a plurality of land portions in the form of ribs and/or blocks distributed according to various configurations, defined and separated from each other by a plurality of grooves directed longitudinally and/or transversely of the tire, the depth of said grooves defining the height of said land portions.

It is known that during tire use the tread is subjected to wear, which wear can be classified according to two distinct types, that is one of (a) an uneven type identified by the appearance of localized early wear marks at some particular areas, the land edges for example where abrasion is more pronounced than at other areas, and (b) one of an even type that goes on at a given velocity until the complete disappearance of the tread pattern. Uneven wearing is particularly dangerous because it greatly affects the tire behavior on driving, giving rise to vibrations and difficulties in keeping the desired path; in addition, since this wearing reveals itself in the form of localized spots even of great width, it can involve extra costs due to the impossibility of using a tire which, taking into account the remaining tread portion, could otherwise still be used, since the residual height of the pattern lands are still prominent.

Even wearing affects the tire behavior on the road to a lesser degree and in particular its effect consists of progressively reducing the tire features in terms of traction capability and resistance to aquaplaning, but the rate at which it takes place is an essential qualitative element in judging a tire, since a slow rate of wear corresponds to a long duration of the tire, which is a desired requirement.

On planning a new tire as well as on carrying out quality control of an existing tire, it is therefore of the greatest importance to verify the type and rate of wearing of the tread band. The verification method mainly used at the present time consists in making a vehicle, provided with test tires, driving over a given road circuit, bringing the tire to its complete wearing or in any event until an important reduction in the tread band thickness occurs; in this manner it is possible to progressively evaluate, by means of inspections at subsequent times, whether the tire wearing is of an even or uneven type and, at the end of the service life of the tire, the rate of wear of the tread. Unfortunately, for this type of test very long execution times are required in that only abrasions of some importance can be seen with the naked eye and can be measured using the present measurement means and methods which substantially enable wear to be measured through the measurement of the decreased depth of the grooves and the loss of weight suffered by the tire. Therefore, the above are very demanding and expensive tests, due to the fact that it is necessary to make use of several persons and related vehicles over a long period of time; in this connection, it is important to remember that evaluations are always made by comparison with sample tires.

For example, the tread of a tire may come to the end of its service life after it has covered a distance of about 50,000 km in the case of usual car tires and a distance as high as 150,000 km in the case of heavy duty tires. Practically, if in a very simple manner a distance of 1,000 km per day is assumed to be covered, the conclusion is that for each type of tire to be tested a person and a test means need to be used over a period of time varying from two to five months.

As an alternative solution to road tests, attempts have been made to standardize the so-called "indoor" wear tests, that is tests performed in the laboratory, in workshops or in any case in suitably equipped premises, where the tire is set in rotation against a wheel of a much bigger diameter than that of the tire and covered with a layer of material having predetermined abrasive features. However, as well known to those skilled in the art, the results of indoor tests can be scarcely correlated with those of road tests; in particular, they greatly depend on the selected abrasive layer and the test modalities, and the abrasion layer features and test conditions do not always succeed in correctly simulating the abrasions caused to the tire during the actual road use. In conclusion, said indoor tests are sometimes trustworthy but sometimes not very reliable, so that they substantially do not seem to have the capability of foreseeing the actual behavior of the tire in use.

SUMMARY OF THE INVENTION

The inventors believe that if it were possible to highlight wear of a small amount in the tread band it would also be possible to carry out road tests of a greatly reduced duration and well capable of foreseeing the final results.

Accordingly, in one aspect, the invention relates to a method of foreseeing and/or controlling wearing of a tread band of a pneumatic tire for vehicle wheels, including the steps of:

a) making a plurality of radial cuts in at least one portion of the radially external surface of said tread band, the depth, width and mutual distance between said cuts being such that, while the tire is being run, a mobility (a movement) is not caused in the portion of said band between pairs of adjacent cuts relative to the corresponding radially more internal band portion which is not cut;

b) rotating the tire at a predetermined speed and with a predetermined load in contact with a friction surface;

c) stopping the tire;

d) verifying wearing of said tread band portion through observation of the maintenance conditions of said cuts.

This result is preferably achieved by keeping the width of said cuts to a value that does not exceed 0.2 mm, and preferably not exceeding 0.1 mm, with the depth of said cuts not exceeding 0.5 mm and the distance between said cuts being at least 2 mm.

Preferably according to this method, steps b), c), d) are provided to be repeated until the cuts have completely disappeared, due to abrasion of the tread portions between each pair of adjacent cuts. In a preferred embodiment, the method is characterized in that in said tread band portion, cuts are made of a depth between 0.1 and 0.4 mm and most preferably between 0.1 and 0.2 mm.

In accordance with additional aspects of carrying the method of the invention into effect, said cuts are all parallel to each other, inclined to the circumferential direction of the tire and axially extended from one extremity to the other of said tread band or, alternatively, are all parallel to each other and to the equatorial plane of the tire. The method further provides for said cuts to be distributed into at least two groups of cuts respectively crossing each other and, preferably, for said cuts to be distributed into at least two groups of cuts of different depth. Conveniently, said groups of cuts of different depth can be formed in different portions of said tread band surface, one portion for each group, or in the same portion, alternated with each other.

Advantageously, the method disclosed herein enables the wear rate of the tread band to be foreseen and/or controlled, preferably according to the steps of:

e) detecting the successive times necessary for the complete disappearance of the cuts of different depth in each group;

f) calculating the wear rate of the tread band depending on said successive times of abrasion of the tread portion confined between the cuts of each group, involving the consequent disappearance of said cuts.

In a different aspect, the invention relates to a method of making said cuts in the tread band by using laser technology or, alternatively, of making the cuts by means of a mold, that is by creating ridges corresponding to said cuts at the mold surface facing the radially external surface of said tread band, using photoengraving techniques for example.

In a further aspect, the invention relates to a pneumatic tire for vehicle wheels comprising a carcass of toric form with a crown and a tread band located on said crown characterized in that on at least one circumferential portion of the radially external surface of said tread band a plurality of radial cuts is formed, the depth, width and mutual distance of said cuts being such that, while the tire is being run, a mobility or movement is not caused in the portion of said band between pairs of adjacent cuts relative to the corresponding radially more internal band portion which is not cut; preferably this result is achieved by keeping the width of said cuts to a value not exceeding 0.2 mm, and preferably not exceeding 0.1 mm, the depth of said cut to values not exceeding 0.5 mm and the distance between said cuts to values at least as high as 2 mm. In a more specific embodiment, the invention relates to a tire the tread band which is molded with a pattern comprising a plurality of reliefs defined by a corresponding plurality of grooves formed in the band thickness which is provided, on at least one relief, with radial cuts of a depth between 0.3% and 3% of the height of said relief.

Preferably said cuts are formed in at least three distinct portions of the radially external surface of the tread band, circumferentially offset relative to each other; most preferentially, said three portions are circumferentially offset by 120°. In accordance with different preferred alternative solutions, said cuts have a depth of between 0.1 and 0.4 mm, are all parallel to each other, inclined to the circumferential direction of the tire and axially extended from one extremity to the other of said tread band. In a preferred embodiment, said cuts are distributed into at least two groups of cuts respectively crossing each other, oriented symmetrically to the equatorial plane of the tire, and define rhombs having diagonals of different length on the tread band, the major diagonal being parallel to the direction of the equatorial plane. Preferably, said cuts are divided into at least two groups of cuts of different depth, distributed on different portions of said surface of the tread band, one for each group, or alternatively also on the same portion of said surface, alternated with each other. In an alternative solution, said cuts are all parallel to each other at a zero angle to the direction of the equatorial plane of the tire.

Advantageously, all the above embodiments enable minimum abrasions of the tread band to be verified in an immediate manner.

In a different aspect, the invention relates to a vulcanization mold for tires in which, on at least one portion of the mold's inner surface facing the corresponding radially external surface of the tire tread band, is provided with ridges of a height not exceeding 0.5 mm.

In a further different aspect, the invention also relates to a method of comparing the behavioral features of the suspension systems of at least two different vehicles equipped with substantially equivalent tires in terms of sizes and performance, through the inspection of the different type and degree of wearing suffered by the treads of identical and identically cut tires mounted to said vehicles.

Preferably the method comprises the operating steps of:

a) mounting identical tires in terms of structure, constituent materials and tread pattern and provided with identical cuts formed according to the method of the invention, at least to the same extremity of the corresponding axle of each vehicle;

b) making the vehicles run on an identical path under the same running conditions;

c) stopping each vehicle after the same running time;

d) inspecting the maintenance conditions of the cuts in said tires and comparing them with each other so as to establish the behavior of the suspension system of each vehicle and, by direct comparison, the spring system offering the best performance as regards tire wear.

Obviously, steps b–d can be repeated several times, until said cuts have completely disappeared so that a sure evaluation of the differences existing between the spring systems under examination is achieved.

BRIEF DESCRIPTION OF THE DRAWINGS

The present invention will be more fully understood with the aid of the following description and the accompanying drawings exclusively given by way of illustration and not in a limiting sense, in which.

DETAILED DESCRIPTION OF PREFERRED EMBODIMENTS

Figure 1:
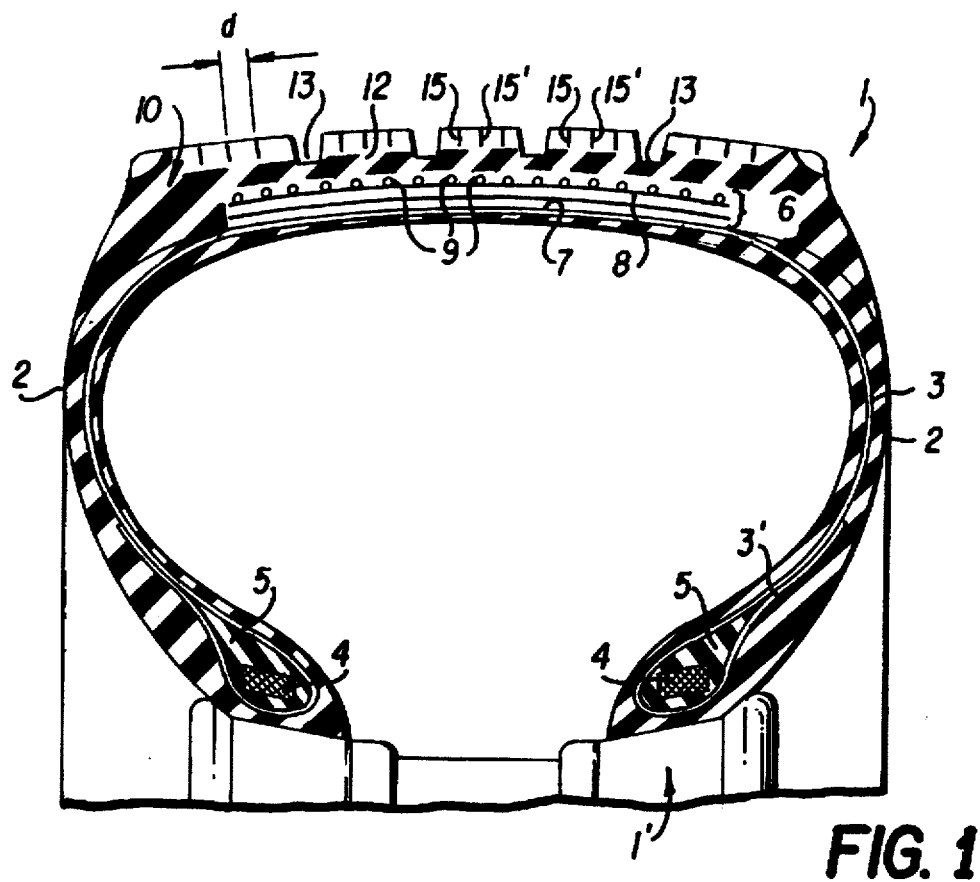
FIG. 1 shows a tire of known type provided with a tread according to the invention, in an axial cross-sectional view.

The right section of a tire of the invention, according to a plane containing the rotation axis of the tire, is identified by numeral 1 in FIG. 1. In a manner known per se, the tire comprises a carcass 2 of toric form with a crown to which a tread band 10 is disposed which is made of elastomeric material and constitutes the ground-contacting area of the tire. For the sake of completeness, the traditional structure of a radial-carcass tire is briefly described hereinafter, although the tire structure, as will be seen in the following, is quite irrelevant and consequently not restrictive in connection with the present invention. The carcass 2 is usually formed of at least one ply 3 of rubberized fabric reinforced with cords disposed in the plane of the right tire section, having its extremities 3' folded radially outwardly and back around anchoring bead cores 4. Filler strips 5 of an elastomeric material having an appropriate hardness are disposed between the ply 3 and the folded flaps 3'. As known, the tire area comprised of the bead core 4 and filler strips 5 constitutes the so-called tire bead and is designed for securing of the tire to a corresponding mounting rim 1'.

Disposed around the carcass 2 is a belt 6 consisting of two layers 7, 8 of cords crossed with each other and relative to the equatorial plane of the tire. The belt optionally includes a radially more external layer 9 of circumferentially-oriented cords, that is parallel with e.g. oriented at 0° degrees relative to the equatorial plane of the tire. Disposed on the belt 6 is tread band 10 made of an appropriate elastomeric material, provided with a predetermined geometric configuration and molded with a raised pattern to give the tire an excellent grip on the ground and appropriate behavioral qualities on the road. In general said pattern comprises a plurality of land portions 12 (continuous ribs and/or blocks) defined and separated from each other by a corresponding plurality of grooves directed both longitudinally 13 and transversely (not shown) and the depth of which also defines the height "h" of the land portions. The pattern may also include narrow indentations (the well-known "fins" or "lamellae") on each land portion, which indentations are not herein shown for the sake of clarity.

Figure 2:
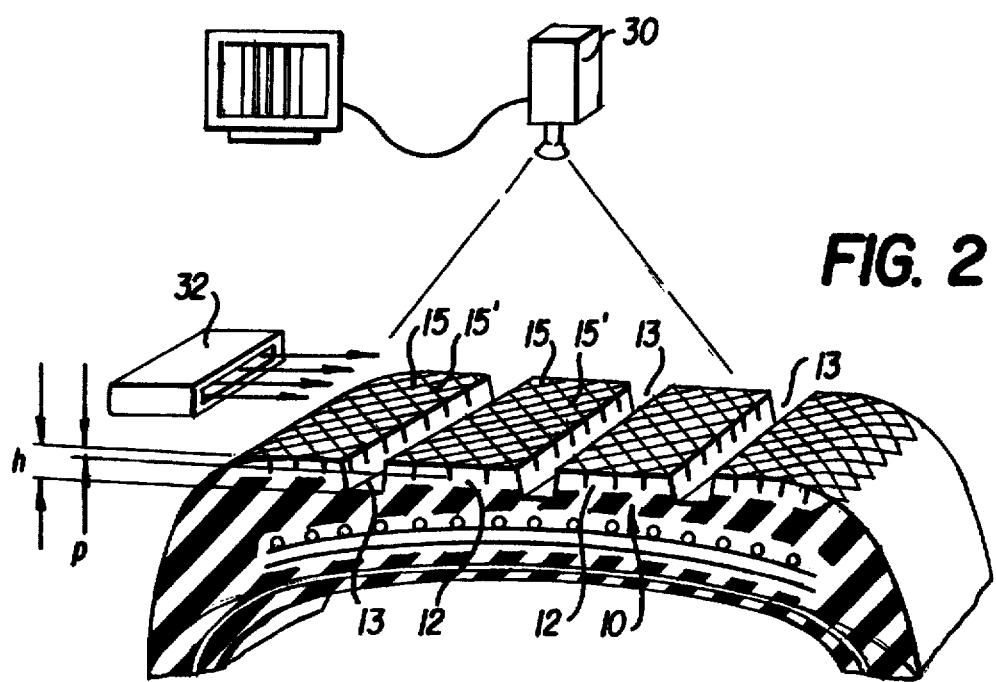
FIG. 2 is a fragmentary perspective cross-sectional view of a circumferential portion of the tread band of the tire shown in FIG. 1.

Irrespective of the fact that the tread band is slick or provided with a raised pattern, in accordance with the invention, a plurality of variously-disposed narrow radial cuts 15, 15' is formed on at least one circumferential portion of the radially external surface of said tread band, as shown in FIG. 2. More particularly, said cuts have such a depth, width and mutual distance that, while the tire is being run, they do not cause a mobility or movement of the portion of said band (that is the portion of elastomeric material) located between pairs of adjacent cuts relative to the corresponding radially more internal band portion (of elastomeric material) which is not cut. This result is preferably achieved by keeping the width of said cuts to a value not exceeding 0.2 mm, and preferably not exceeding 0.1 mm, the depth "p" of the cuts to values not exceeding 0.5 mm and the distance "d" between said cuts to values at least as high as 2 mm. More preferentially, said depth is between 0.1 and 0.4 mm and most preferentially between 0.1 and 0.2 mm. In a tread pattern which is preferably in compliance with said values, these cuts have a depth conveniently between 0.3% and 3% of the height "h" of the land portions usually in the range of 4 to 12 mm in car tires and in the range of 12 to 18 mm in heavy duty tires.

This plurality of cuts is made for the only purpose of foreseeing and/or controlling the tread wearing by their disappearance, as explained in the following. Therefore they do not perform any function as regards road holding of the tire, neither do they modify the tire performance in a significant manner.

Said cuts can be formed on the tread band following different methodologies among which a person of ordinary skill in the art, after becoming acquainted with the invention, will have no difficulty in selecting the most appropriate for the purpose. The inventors have found it preferable to make use of a laser technique consisting of producing these cuts on a vulcanized tire tread band by cutting the elastomeric material by means of a laser beam interlocked to a command and control computer. This technique enables the inventive method of foreseeing and controlling wearing, to be applied to any tire and at any moment, and allows the marking of the cuts to be carried out in a very short period of time. Alternatively, said cuts could be directly made by a mold for example, during the vulcanization of the tire; practically, it is only necessary to provide the mold surface facing the radially external surface of the tread band with a plurality of ridges corresponding to the cuts. These ridges can be made for example using sintered powders and the like and/or the same means as employed in producing boards for electronic circuits, that is by resorting to known photoengraving techniques.

As already said, cuts 15 are formed on at least one circumferential portion of the external surface of the tread band; preferably this portion takes all the band width and extends circumferentially over an arc of at least 120°; more preferably the tire has at least three circumferential portions provided with said cuts, preferably offset through 120° and most preferably the tire has a succession of portions extending over the whole circumferential extension of the tread. Conveniently, cuts of different shape and/or depth can be formed on the tread surface; in this case said cuts are distributed into at least two groups of cuts of different type, disposed on the same portion or on subsequent portions of the tread band.

In the accompanying figures, for the sake of convenience, only rectilinear cuts are shown, but the use of cuts of different shape is not excluded in the present invention and as will be apparent in the following; for example, said cuts could have a curvilinear course or comprise both curvilinear and rectilinear lengths.

In a first embodiment, the cuts are all parallel to each other, inclined to the circumferential direction of the tire according to an angle "x" preferably between 30° and 60° and axially extended from one extremity to the other of said tread band, such as cuts 15 in FIG. 2. More conveniently, said cuts are distributed into at least two groups of cuts (15 and 15') respectively crossing each other; in this case they are also preferably oriented symmetrically to the equatorial plane of the tire and, most preferably they define microblocks in the form of rhombs having diagonals of different length on the tread band, the major diagonal being parallel to the direction of the equatorial plane, as better shown in FIG. 3.

In a preferred embodiment, the ratio of the major diagonal to the minor diagonal is substantially 1.5. Still in a preferred manner, the rhombs define microblocks of the same area when the cuts are of the same depth. According to a different convenient embodiment, said cuts are all parallel to each other and to the equatorial plane of the tire, as shown at 24 in FIG. 5.

In a different alternative version, said groups of different cuts are distributed on different portions of said tread band surface, one portion for each group, and in another alternative version said groups of different cuts are distributed on the same portion of said tread band surface, alternated with each other.

Figure 3:
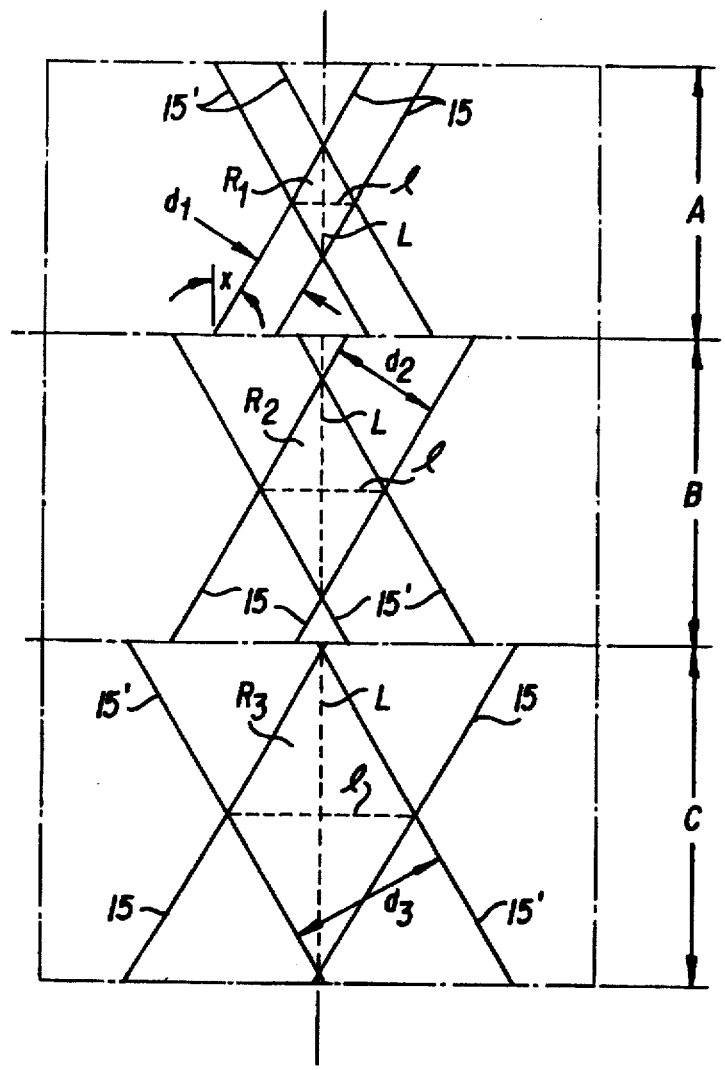
FIG. 3 is a top view, showing an exemplary schematic diagram of three portions of the tread surface provided with cuts according to the invention.

FIG. 3 shows a first preferred example embodying the invention; the external surface of the tread is comprised of three cut portions (A, B, C) disposed in a circumferential succession with respect to each other. Conveniently the three areas A, B, C are circumferentially offset relative to each other by 120° and extend to cover the whole circumferential extension of the tire. Each of the three portions comprises a plurality of mutually-crossed cuts 15, 15', as above described, forming a plurality of rhombs (R1, R2, R3) having diagonals L and l of different length, the major diagonal (L) being oriented in the direction of the equatorial plane. For the sake of simplicity, in FIG. 3 only two of the great number of rhombs generated by said cuts in each area are shown.

In the following table the values of the dimensional features of the rhombs and the cut depths in the three areas A, B, C are reproduced, expressed in millimeters (mm).

TABLE

| RHOMBS and AREAS | A | B | C |
| --- | --- | --- | --- |
| Diagonal l | 5 | 7 | 9 |
| Diagonal L | 2.9 | 4.1 | 5.2 |
| CUTS |  |  |  |
| depth | 0.1 | 0.2 | 0.25 |
| width | 0.05 | 0.05 | 0.05 |

From the increase in the diagonals size one can immediately learn that the mutual distance between each pair of adjacent cuts (d1, d2, d3 respectively) increases with the increase of the depth of said cuts.

Figure 4:
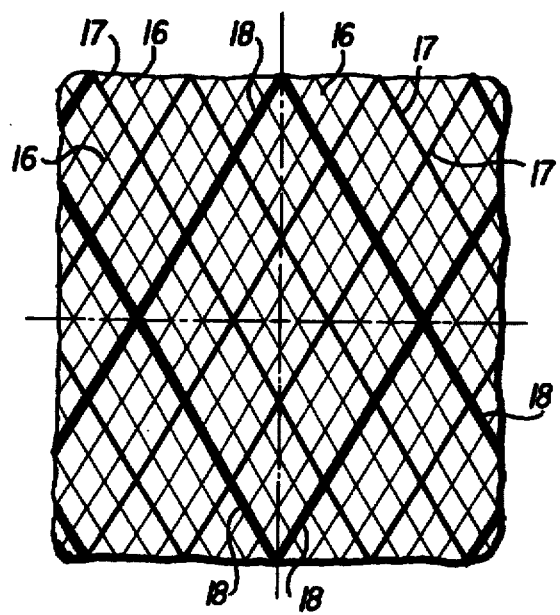
FIG. 4 shows a first alternative version of the cuts of the invention in the same view as in FIG. 3.

FIG. 4 shows an alternative version to the one shown in FIG. 3, in accordance with the solution of disposing groups of different cuts on the same surface portion of the tread, alternated with each other. In more detail, the tread band surface is comprised of at least one area in which it has been respectively formed:

- a first group of mutually-crossed cuts 16 having a predetermined depth of minimum value;
- a second group of mutually-crossed and parallel-disposed cuts 17 arranged in an alternated relationship with the cuts of the first group and of greater depth than the preceding cuts;
- a third group of mutually-crossed and parallel-disposed cuts 18 arranged in alternated relationship with the cuts of the other groups, and having a greater depth than the preceding groups of cuts.

In particular, the width and depth of the cuts in the three groups are those already mentioned in connection with FIG. 3. In other words, a lattice of rhombs is made which is generated by a module of three concentric rhombs which is repeated several times on the concerned portion of the tread surface, in which each rhomb is delimited by two crossed pairs of parallel adjacent cuts of the same depth.

Practically, the three types of rhombs shown in FIG. 3 have been created again, with the difference that instead of the distribution of the three types of rhombs on three distinct areas of the tread surface, there is a rhomb arrangement in which the rhombs are disposed inside each other in a single tread area; in this case the cut distribution has been done so as to ensure that for each rhomb the size of the diagonals is the minimum necessary size in relation to the depth of the four cuts defining said rhomb. In addition, still in the same manner as above mentioned, the values of the mutual distance and depth of the cuts in the three groups are predetermined so as to give stability to the various confined portions of elastomeric material. Obviously, other forms are also possible, based on lines generating polygonal areas different from the rhombs, such as forms comprising circles for example, still concentric with each other. In any case, for any embodiment, on passing from one figure to the one concentrically more external, the Applicant has found it convenient, for each increase of 0.1 mm in the depth of the cuts, to assign a corresponding percent increase of between 10% and 50% to the area confined by said cuts. It has been found in fact that said area increase, carried out according to predetermined values, causes the portion of elastomeric material of the tread band between the cutting lines of greater depth to be made stiffer, thereby preventing this portion from being deformed and worn out under load due to its own mobility, which would alter the wear test results.

Figure 5:
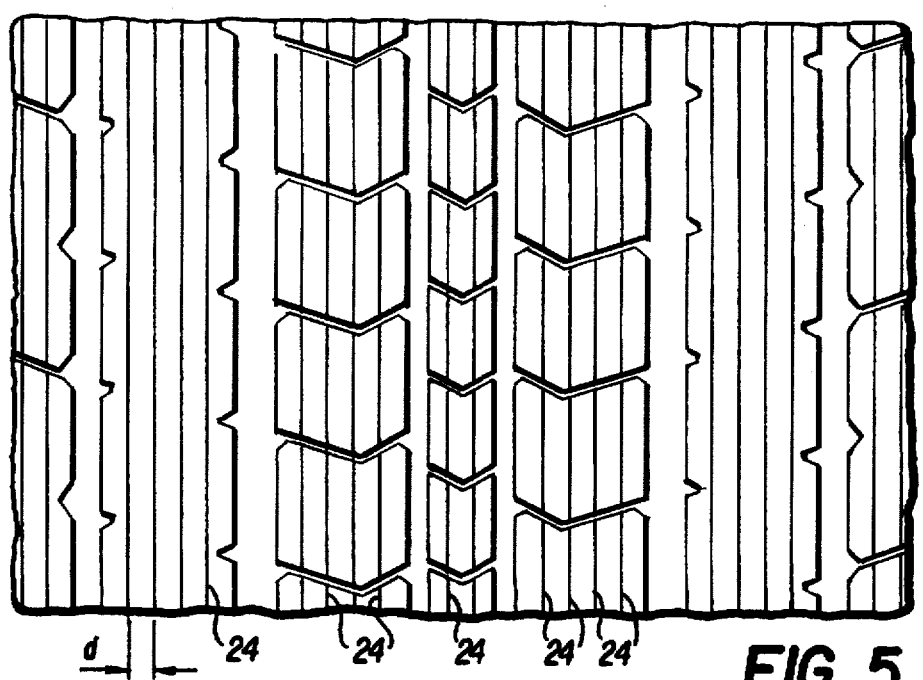
FIG. 5 shows a second alternative version of the cuts of the invention in the same view as in FIG. 3.

FIG. 5 shows another convenient embodiment of the cuts according to the invention, characterized in that said cuts 24 are all parallel to each other and oriented in a circumferential direction; after the preceding considerations it will be apparent that the mutual axial distance between two adjacent cuts is selected in relation to the depth of the deeper cut in said pair of cuts. As can be seen, this embodiment is particularly advantageous in connection with a specific methodology of inspection of the maintenance state of the cuts and therefore of detection of abrasions on said tread band.

The tire of the invention being known, one is now capable of understanding the method of foreseeing and/or controlling the wear of a tire.

Figure 6:
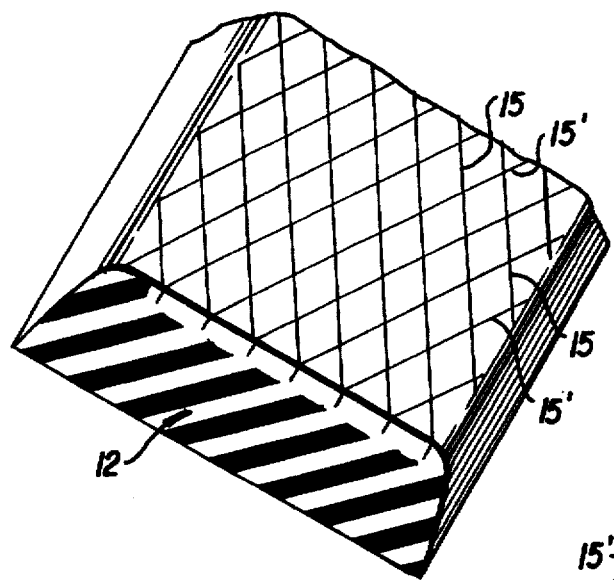
FIG. 6 is a partial perspective view of a portion of the tread band of a tire provided with a preferred type of cuts at the beginning of a wear test.
Figure 7:
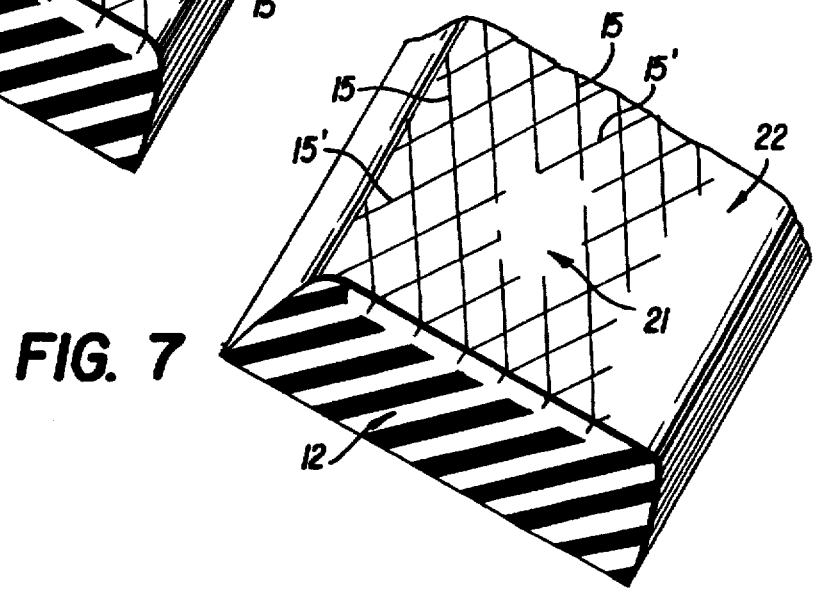
FIG. 7 is a view of the same tread band portion as in FIG. 6 showing an example of uneven wearing which appeared immediately after the beginning of the test.

FIGS. 6 and 7 illustrate both a circumferential portion of the (slick) tread band and the radially-external surface of a land portion (block) provided with a plurality of crossed cuts formed in accordance with the solution described in FIG. 2 (or alternatively in FIGS. 3 and 4), before the wear test and during this test respectively. Preferably the test is preceded by a running-in step of the tire to enable possible settlings of the different tire components so as to avoid said structural settlings giving rise to anomalous starting of wear in the tread band that would alter the test results and therefore the provision and control of the actual tire wearing. This running-in step may involve runs between 500 and 1000 km for a usual car tire and in the order of 3000 km for a heavy duty tire. When the running-in is over, cutting of the tread band is executed according to the above modalities, provided that the tire has not been already cut during the molding and vulcanization step, for example, and that these cuts are still present.

The wear test consists in making the tire run on a road under predetermined load, pressure and speed conditions, along a pre-established circuit in connection with the type of tire being tested and the type of test required, and stopping the vehicle every 500–1000 km of run, that is about once a day, for inspection of the state of maintenance of the cuts.

By way of example only, the test conditions to be used for a heavy duty tire, size 315/80 R 22.5", along a mixed road/highway circuit are herein briefly mentioned; they are as follows:

Load on the tire=3000 kg

Inflation pressure=7 bar

Running speed=60 km/h.

The vehicle being at a standstill, the maintenance state of the cuts is inspected, that is the presence or absence of said cuts on the tread band and, if said cuts are still partly present, the possible variations in the development of same. This inspection includes verification that the tire is still at its correct inflation pressure for that test, usually and preferably the normal inflation pressure for that tire. It is clear that cuts disappear when and where the tread band wearing corresponds to the depth of the cuts, i.e. is in the order of 0.5 mm at most, and it is also clear that while an abrasion of such a reduced amount cannot be detected by any of the methods and means of the known art, the partial or complete disappearance of said cuts can be seen with the naked eye. Practically, it has been found that resorting to the solution of making cuts in the tread according to the invention, as above illustrated, enables wear tests to be carried out in a period of one day or very few days, which involves an important gain in manpower and inspection means with respect to the traditional tests.

The invention offers many advantages. The method of the invention first of all enables starting and development of any type of uneven wearing to be rapidly verified on the tread band and in particular on the land portions of the tread pattern. This occurs because these uneven wear areas are highlighted in advance by the presence of smooth spots as shown for example by areas 21, 22 on the tread surface portion represented in FIG. 7, where portions provided with cuts have disappeared due to the complete abrasion of the elastomeric material included between said cuts. An early signaling of this type of wearing is of the greatest importance from an economical point of view and it positively affects the time required for the development of prototypes, in that wear elimination always involves some modifications to the tread pattern and/or the tire structure for the accomplishment of which, as known, important amounts of time and costs are required. To this end, the invention achieves the further advantage of offering the possibility of inspecting the behavior of different blends and different patterns in short periods of time and simultaneously, while also offering reliable orientation indicia to the designer for selecting the optimal solution. The above result is achieved by providing the tire with a tread band having circumferential portions of different blends or by molding the tire tread with circumferential portions of different patterns and, preferably, by adopting the same type of cuts over the whole tire circumference. Clearly, abrasions different in type and amount will be attributable to the different blend qualities and different geometrical features of said different patterns.

It is now evident the importance of one of the fundamental features of the invention is in providing the cuts in the tread band with such geometrical sizes and mutual distances that the movement of the "microblock" consisting of the elastomeric material portion enclosed between crossed pairs of adjacent cuts is not allowed relative to the radially more internal portion of the tread. The inventors have become aware of the fact that, otherwise, the test results would be marred by the wear to which said microblock would have been submitted by effect of its relative mobility on the ground contact area. Thus it has been found to be of great importance to provide, together with the increase of the cut depth, a simultaneous increase of the mutual distance between said cuts and therefore an increase in resistance to movement in the portion of the elastomeric material delimited by said cuts. Therefore, in a convenient manner the dimensional values of the polygonal areas (whatever they are) included between the cuts, as well as the depth of said cuts are selected so as to stiffen the elastomeric materials enclosed between said cuts.

In addition, the invention has enabled the availability of a method for testing the actual behavior of the tire structure and the tread blend on a road in a very quick manner in terms of resistance to wear, which has been impossible until now, making planning of prototype tires quicker and more reliable. It is in fact apparent that wearing on a slick tread band only depends on said elements, structure and materials, whereas uneven wearing on a tread band molded with a raised pattern, after the even wearing of the corresponding slick band has been reached, exclusively depend on the pattern features.

In accordance with this embodiment, said cuts are formed on the external surface of a slick tread, then wear tests are carried out in order to ascertain indicia for evaluating the quality of the blend forming the tread band and the evenness and stability of the tire structure and above all the reinforcing belt. It is clear that test results on a slick tread are not affected by the tread pattern features, since in this case the tread pattern is absent. To the contrary, when the test is carried out, as usual, with a tire provided with a tread pattern, wearing is always affected, to a greater or lesser degree, by the movement and the consequent rubbing of the blocks on the ground area they contact.

Subsequent to the wear tests carried out with a slick tread, another series of tests can be conveniently carried out using the same tire on which the desired tread pattern has been formed, following known tests. Such further wear tests on the same tire enable the validity of the tread pattern to be verified.

It is also well apparent that having cuts of different depth on the tread band is useful: in fact, said cuts enable prosecution of the test and inspection of the abrasion development as and when the less deep cuts disappear, until the deepest cuts also have disappeared. Thus the evaluation of the wear rate too is made easier, as well as, as a result, the estimate of the tread duration, without being obliged to bring the tire to the end of its service life.

Measurement of the tread wear rate is carried out, as already explained, by resorting to repeated cycles of tire notations alternated with stops, taking note of the time necessary for disappearance of the cuts in each group. For example, in the case previously depicted in FIG. 3 and relating to three groups of cuts of increasing depth, the tread wear rate is measured by a Cartesian diagram. The Cartesian diagram reproduces the depth values p1, p2 and p3 of the cuts in the three areas A, B, C on the y-axis and the times t1, t2 and t3 (expressed in the amount of covered kilometers) of complete disappearance of the cuts for each of the three groups on the x-axis. The coordinate points (p1, t1) (p2, t2) and (p3, t3) enable a line passing through them to be drawn, which line identifies the tread wear rate (expressed in covered kilometers per tread mm) and allows the tire duration to be foreseen by extrapolation.

The advantage achieved by the invention is still more apparent if one considers that for carrying out calculation of the wear rate it is sufficient to make use of only two groups of cuts of different depth. It is apparent that in the absence of cuts of different depth, the tire wear rate could be evaluated only by forming new cuts in the tire as soon as the previous ones have disappeared, which, although possible, involves an increase in the test time and costs. Advantageously, the invention enables the use of very sophisticated methods for inspecting the maintenance state of the cuts and therefore the tread band wear of the tire under examination.

A preferred method is the one consisting of "reading", by means of a video camera, the tread band of a tire prepared according to the invention, preferably comprising circumferential cuts as previously described with reference to FIG. 5 on at least one portion of the external surface of said tread band. The tread band surface can either be slick or provided with a tread pattern.

In more detail, the present method provides for the external surface of the tread to be lit up by a so called "grazing light" that is a light source 32 directed generally tangentially to the tread surface, after the tire has been stopped. Then, the external surface of the tread band subjected to said grazing lighting is viewed by at least one video camera 30 (see FIG. 2) looking at the tread surface from a position which will best make visible any remaining lines. This may be, as shown in FIG. 2, generally perpendicular to the surface. The grazing light lights up said surface but not the bottom of the cuts, in that it is not capable of penetrating through the narrow cut throats and therefore said cuts remain dark and cause a black image. As abrasion goes on, the cut depth is reduced and the light will diffuse into the cuts to a degree substantially proportional to the reduction of the depth of same, thereby modifying the image of said cuts which appears black at the beginning and, passing through different shades of grey, reaches the maximum brightness when the cuts have completely disappeared. By virtue of the video camera shooting, one can have on a video screen connected to said camera or, preferably, to a computer, at least one image of the tread surface divided into a plurality of pixels disposed on horizontal and vertical rows crossed with each other at right angles and can detect the amount of the image brightness at each of said pixels.

As known, this operation is based on the fact that a photo diode is associated with each pixel, which is capable of emitting an analog voltage signal proportional to the intensity of the light striking it. In turn the analog signal may be converted to a digital signal sent to an electronic control box where the received signals are processed. Values attributable to each pixel, converted to digital signals, can vary depending on the received light intensity, from zero to 256. Then a zero-brightness value is assigned to each pixel corresponding to a black point, that is an area of the cut which is dark to the grazing light and a value of 1 to each pixel at the points (completely abraded areas) where the maximum diffusion of the grazing light occurs. Clearly a brightness value other than zero and smaller than 1 (within a scale of 256 values with a 8-bit representation system) is assigned to each pixel corresponding to points of the cuts corresponding to areas of reduced depth relative to the origin value, due to abrasion of the surrounding elastomeric material. Finally, through processing of the digital signals that have reached the electronic control box, wearing of the tread surface is verified depending on the light intensity values of each pixel, reconstructing in this manner the limits of the worn out area and the wear amount.

By virtue of the present invention, a very rapid method is also available which compares the behavioral features of the suspension system in at least two different vehicles equipped with substantially equivalent tires in terms of sizes and performance, through inspection of the different type and degree of wear of the tread suffered by identical tires provided with identical cuts and mounted to said vehicles. In the same manner as above described with reference to the wear test carried out on a tire first with a slick tread and subsequently with a tread having a raised pattern, the inventors have become aware of the fact that, in the same manner as wear differences between different tires tested on the same vehicle depend on the tire features, likewise wear differences between identical tires provided with identical cuts, mounted to different vehicles, depend on the features of the suspension system in the vehicles.

It is clear that, in order to achieve meaningful results, the two vehicles must be provided with substantially equivalent tires. In accordance with the invention, said comparison method first of all involves mounting identical tires in terms of structure, constituent materials and tread pattern at least on the same extremity of the corresponding axle of each vehicle, which tires are provided with identical cuts formed according to any one of the variety of modalities described above. At this point, the vehicles are run on an identical path under the same running conditions and stopped after the same run time. Then the maintenance conditions of the cuts in said tires are inspected and compared, thereby determining the behavior of the spring suspension system of each vehicle. This suspension system behavior clearly is responsible for the type and degree of wearing in the tire, since it is the only variable element in the two compared systems. Therefore, by direct comparison, a judgment on the spring system offering the best performance, at least as regards tire wear, can be drawn. It is understood that steps b–d can be repeated several times, until said cuts have fully disappeared and until a sure evaluation of the differences existing between the spring suspension systems under examination has been reached.

It also pointed out that, while the inventive method and tire have been always referred in the present description to tire tests on the road, they also apply in the same manner to the already mentioned indoor tests.

It is also apparent that the present description is only explanatory and not restrictive and therefore all modifications and variations not expressly illustrated but that can be easily deduced by a person of ordinary skill in the art must be considered within the scope of the present invention, as defined in the appended claims.

The invention claimed is:

1. A method of foreseeing wear of a tread band in a pneumatic tire for vehicle wheels, said method comprising the steps of:

a) forming a plurality of radial cuts in at least one portion of a radially external surface of said tread band, a first plurality of portions of said at least one portion lying between pairs of adjacent said cuts, said tread band comprising an internal band portion which directly underlies said at least one portion to be radially more internal relative to the at least one portion, said cuts of said at least one portion extending at most through a depth of said at least one portion, said internal band portion comprising a second plurality of portions which are not cut, wherein each portion of said second plurality of portions underlies a respective one of each of said first plurality of portions, the depth, width and mutual distance between said cuts being such that each portion of said first plurality of portions is immobile relative to the respective underlying portion of said second plurality of portions while the tire is being rotated;

b) rotating the tire at a predetermined speed and with a predetermined load in contact with a friction surface, said cuts not performing any function as regards road holding of the tire;

c) stopping the rotating of the tire;

d) verifying wearing of said at least one tread band portion through observation of disappearing of said radial cuts after the tire has stopped.

2. A method as in claim 1, where in a laser beam contacts said tread band to form said cuts.

3. A method as in claim 1, wherein said cuts are formed by means of a mold operating on the radially outer surface of said tread band.

4. A method as in claim 3, wherein ridges corresponding respectively to said cuts are provided on the mold surface facing the radially external surface of said tread band, said ridges being formed by photoengraving.

5. A method as in claim 1, wherein said cuts are all parallel to each other, inclined relative to the circumferential direction of the tire and axially extended from one axial extremity of said tread band to another axial extremity of said tread band.

6. A method as in claim 1, wherein each of said cuts are parallel to each other of said cuts and to an equatorial plane of the tire.

7. A method as in claim 1, wherein said cuts are distributed into at least first and second groups of cuts respectively, said first group of cuts crossing said second group of cuts.

8. A method as in claim 1, wherein said cuts are distributed into at least two groups of cuts of different depth.

9. A method as in claim 8, wherein said groups of cuts of different depth are formed in different portions of said tread band surface, one portion for each group.

10. A method as in claim 8, wherein said groups of cuts of different depth are formed in the same portion of said tread band surface such that the cuts of one of said groups alternates with the cuts of another of said groups.

11. A method as in claim 8, further comprising the steps of:

e) repeating said steps b, c and d; and detecting the number of repetitions of said steps b, c and d necessary for the complete disappearance of the cuts of different depth in each group of said at least two groups of cuts;

f) calculating a wear rate of the tread band depending on said number of said repetitions for causing the disappearance of said cuts of each group.

12. A method as in claim 1, wherein step d) includes the steps of:

d') lighting up the external surface of the tread with lighting as a grazing light from a tangentially portioned light from an axial direction of the tire;

e') viewing the external surface of the tread band submitted to said lighting with at least one video camera;

f') obtaining by said video camera, at least one image of the tread surface divided into a plurality of pixels disposed on horizontal and vertical crossed rows, said horizontal rows crossed at right angles to said vertical rows;

g') detecting a brightness degree of the at least one image at each of said pixels of said plurality of pixels;

h') assigning a brightness value of zero to each said pixel of said plurality of pixels detecting a black point, corresponding to an area of the respective cut of the tread band which is dark to the grazing light;

i') assigning a brightness value of one to each said pixel detecting maximum brightness, corresponding to an area of the surface of the tread band showing the maximum diffusion of the light;

j') assigning intermediate brightness values between zero and one to each said pixel detecting a grey point corresponding to an area of a cut of reduced depth relative to its depth prior to step be being first performed, with partial diffusion of the light depending on said reduced depth;

k') verifying wearing of the tread surface depending on the brightness degree of each said pixel.

13. A method of comparing the behavioral features of the suspension systems of two different motor vehicles comprising the steps of:

a) mounting identical tires in terms of structure, constituent materials and tread pattern and provided with identical cuts formed according to the method of claim 1, at least to the same wheel of a corresponding axle of each vehicle;

b) running the vehicles on an identical path and subjected to the same time, load, pressure and speed conditions;

c) stopping each vehicle after the same running time;

d) inspecting the wearing condition of the cuts in said tires and comparing them with each other so as to establish the behavior of the suspension system of each vehicle and, by direct comparison, the suspension system offering the better performance.

14. A method as in claim 1, wherein said cuts have a depth of at most 0.5 mm.

15. A method as in claim 1, wherein said cuts have a depth between 0.1 and 0.4 mm.

16. A method as in claim 1, wherein said cuts have a width of at most 0.2 mm.

17. A method as in claim 1, wherein said cuts have mutual distance therebetween of at least 2 mm.

18. A method as in claim 1, wherein said tread band is molded with a pattern comprising a plurality of reliefs identified by a corresponding plurality of grooves formed in the tread band thickness, the cuts formed in each relief having a depth between 0.3% and 3% of the height of said relief.

19. A method as in claim 1, wherein said cuts are formed on at least three distinct portions of the radially external surface of the tread band, circumferentially staggered from each other.

20. A method as in claim 19, wherein said three portions are circumferentially offset by 120°.

21. A method as in claim 1, wherein the tread band comprises circumferentially oriented ribs, grooves are defined between the ribs, and the cuts are formed into the ribs.

22. A method as in claim 1, wherein the tread band comprises blocks, grooves are defined between the blocks, and the cuts are formed into the blocks.

23. A method as in claim 1, carried out in a tire provided with a tread pattern comprising a plurality of reliefs defined and separated from each other by a corresponding plurality of grooves defining the height of the reliefs, said reliefs giving the tire the gripping quality on the road, said method comprising the steps of making a plurality of cuts in said reliefs in at least one portion of the radially external surface of said tread and verifying wearing of said tread band portion through the disappearing of said cuts in said reliefs.

24. A method as in claim 13, wherein each of said cuts are all parallel to each other of said cuts, inclined relative to a circumferential direction of the tire and axially extended from one axial edge to another axial edge of said tread band.

25. A method as in claim 13, wherein each of said cuts are all parallel to each other of said cuts and parallel to the equatorial plane of the tire.

26. A method as in claim 13, wherein said cuts are distributed into at least first and second groups of cut, said first group of cuts respectively crossing said second group of cuts.

27. A method as in claim 26, wherein said cuts are oriented symmetrically relative to the equatorial plane of the tire.

28. A method as in claim 27, wherein said cuts define rhombs on the tread band, said rhombs having diagonals of different length, the major diagonal being parallel to the direction of the equatorial plane of the tire.

29. A method as in claim 13, wherein said cuts are distributed into at least two groups of cuts of different depth.

30. A method as in claim 29, wherein said groups of cuts of different depth are distributed on different portions of said tread band surface, there being one portion of said tread band surface for each group of cuts.

31. A method as in claim 30, wherein said groups of cuts of different depth are distributed on the same portion of said tread band surface, the cuts of each group of cuts are alternated with the cuts of each other group of cuts.

32. A method as in claim 13, wherein said cuts have depth not exceeding 0.5 mm.

33. A method as in claim 13, wherein said cuts have a depth between 0.1 and 0.4 mm.

34. A method for evaluating the quality of the composition blend forming a tread band in a pneumatic tire for vehicle wheels, said method comprising the steps of:

a) forming a plurality of radial cuts in at least one portion of a radially external slick surface of said tread band, a first plurality of portions of said at least one portion lying between pairs of adjacent said cuts, said tread band comprising an internal band portion which directly underlies said at least one portion to be radially more internal relative to the at least one portion, said cuts of said at least one portion extending at most through a depth of said at least one portion, said internal band portion comprising a second plurality of portions which are not cut, wherein each portion of said second plurality of portions underlies a respective one of each of said first plurality of portions, the depth, width and mutual distance between said cuts being such that each portion of said first plurality of portions is immobile relative to the respective underlying portion of said second plurality of portions while the tire is being rotated;

b) rotating the tire at a predetermined speed and with a predetermined load in contact with a friction surface, said cuts not performing any function as regards road holding of the tire;

c) stopping the rotating of the tire;

d) verifying wearing of said at least one tread band portion through observation of disappearing of said radial cuts after the tire has stopped.

* * * * *